(12) United States Patent
Sugawara (10) Patent No.: US 7,077,349 B2
(45) Date of Patent: Jul. 18, 2006

(54) FISHING LINE GUIDE MECHANISM FOR SPINNING REEL

(75) Inventor: Ken'ichi Sugawara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/819,959

(22) Filed: Apr. 8, 2004

(65) Prior Publication Data

US 2004/0211852 A1    Oct. 28, 2004

(30) Foreign Application Priority Data

Apr. 23, 2003    (JP) ............................. 2003-118498

(51) Int. Cl.
*A01K 89/01*    (2006.01)
(52) U.S. Cl. ..................... 242/231; 242/232
(58) Field of Classification Search ............... 242/231, 242/232
See application file for complete search history.

(56) References Cited

U.S. PATENT DOCUMENTS 5,868,331 A * 2/1999 Shinohara et al. .......... 242/231
6,220,537 B1 * 4/2001 Amano et al. ............... 242/231
6,318,654 B1 * 11/2001 Amano et al. ............... 242/231
6,572,042 B1 * 6/2003 Sugawara .................... 242/231
6,595,449 B1 * 7/2003 Ikuta et al. .................. 242/231

FOREIGN PATENT DOCUMENTS

JP    10-117644 A    5/1998

* cited by examiner

*Primary Examiner*—Emmanuel M Marcelo
(74) *Attorney, Agent, or Firm*—Shinjyu Global IP Counselors (57) ABSTRACT

A bail arm for a spinning reel is mounted to first and second rotor arms and includes first and second bail support members, a bail, a fixed shaft fixedly coupled to the first bail support member, a line roller supported by the fixed shaft, a fixed shaft cover having a mounting recess and disposed spaced apart from the first bail support member, and a mounting member. The bail includes an elongated portion and a bulging portion that is integrally formed with the elongated portion and has a mounting recess. A diameter of the bulging portion increases in a direction away from the elongated portion. The mounting member has one end portion fixedly coupled to the mounting recess of the fixed shaft cover such that the bail is fixedly arranged to the first bail support member, and another end portion fixedly coupled to the mounting recess of the bulging portion.

24 Claims, 8 Drawing Sheets

FISHING LINE GUIDE MECHANISM FOR SPINNING REEL

BACKGROUND OF THE INVENTION

1. Field of the Invention

The present invention relates to a fishing line guide mechanism. More specifically, the present invention relates to a fishing line guide mechanism for a spinning reel that guides fishing line onto a spool and is mounted to the front ends of first and second rotor arms and can be pivoted between a line-guiding posture and a line-release posture.

2. Background Information

A conventional spinning reel is provided with a fishing line guide mechanism that guides fishing line onto a spool. The fishing line guide mechanism is mounted to the front ends of first and second rotor arms, rotates together with the rotor, and is arranged pivotably between a line-releasing posture and a line-guiding posture. The fishing line guide mechanism is furnished with first and second bail support members, a fixed shaft, a fixed shaft cover, a bail, and a line roller. One end of the fixed shaft is fixedly coupled to the front end of the first bail support member. The fixed shaft cover is fixedly coupled to the other end of the fixed shaft. Further, one end of the bail is inserted into the fixed shaft cover and fixedly coupled thereto. Moreover, the line roller is supported by the fixed shaft. The other end of the bail is fitted to the front end of the second bail support member. Japanese patent application publication H10-117644 shows such a structure.

When winding fishing line onto the spool with a spinning reel having a fishing line guide mechanism as described, the bail is pivoted into the line-guiding posture and the handle is rotated. When this occurs, the fishing line is led by the bail and guided via the fixed shaft cover to contact an outer peripheral surface of the line roller. Then, guided by the line roller, the direction in which the fishing line is retracted is changed, and the fishing line is wound around the outer periphery of the spool.

With this type of fishing line guide mechanism, the fixed shaft cover includes, for example, a hole formed at its front end, and the end of the bail is fixedly inserted into this hole. This type of bail includes, for example, an elongated portion, a bulging portion, and a mounting portion. One end of the elongated portion is fixedly attached to the second bail support member. The bulging portion is arranged on the other end of the elongated portion and is in contact with the end portion of the fixed shaft cover. The mounting portion is arranged on the front end of the bulging portion such that the diameter of the mounting portion is smaller than that of the bulging portion. This type of bail is formed by, for example, forging, such that the elongated portion to the mounting portion is formed as a one-piece member in order to maintain a high degree of strength.

With conventional fishing line guide mechanisms, the bail can be formed with a high degree of strength because it is integrally formed from the elongated portion to the mounting portion thereof. However, manufacturing the mounting portion of the bail is particularly complicated because the mounting portion is formed with a diameter that is smaller than the bulging portion, and because the portion of the mounting portion that is to be inserted into the hole of the fixed shaft cover must be formed with a high degree of strength. Thus, if the manufacture of the mounting portion is complex, the rate at which the bails can be produced may decline and manufacturing costs may increase.

In view of the above, it will be apparent to those skilled in the art from this disclosure that there exists a need for an improved fishing line guide mechanism for a spinning reel. This invention addresses this need in the art as well as other needs, which will become apparent to those skilled in the art from this disclosure.

SUMMARY OF THE INVENTION

An object of the present invention is to control manufacturing costs of a fishing line guide mechanism for a spinning reel by simplifying the manufacture thereof.

A fishing line guide mechanism for a spinning reel according to a first aspect of the present invention is adapted to be mounted to front ends of a first rotor arm and a second rotor arm of a rotor of a spinning reel. The line guide mechanism is adapted to be pivotable between a line-guiding posture and a line-releasing posture, and includes a first bail support member and a second bail support member respectively pivotably mounted to front ends of the first rotor arm and the second rotor arm; a line roller rotatively supported by the first bail support member to guide fishing line on its outer peripheral surface; a bail disposed between the first bail support member and the second bail support member to lead fishing line to the line roller; and a mounting member having a first end portion. The bail includes an elongated portion being configured to guide fishing line to the line roller, and a bulging portion being integrally formed with one end of the elongated portion, a width of the bulging portion increasing in a direction away from the elongated portion. The bulging portion has a first mounting recess at its end surface portion. The first end portion of the mounting member is configured to be fixedly coupled to the first mounting recess of the bulging portion such that the bail is fixedly arranged to the first bail support member.

With this fishing line guide mechanism, the elongated portion and the bulging portion are integrally formed, and the separate mounting member is mounted in the bulging portion to fixedly arrange the bail to the first bail support member. Here, the manufacture of the mounting member is simplified when compared to those of conventional structures in which the elongated portion and the bulging portion are integrally formed, because the mounting member is formed separately from the elongated portion and the bulging portion. Thus, the rate at which bails are manufactured can be increased, and increases in manufacturing costs can be controlled. Furthermore, with this configuration, the bulging portion is formed on an end of the elongated portion such that the width thereof gradually increases in a direction toward the mounting member. Thus, it will be easier for fishing line to be guided to the line roller via the bail and the fixed shaft cover portion.

A fishing line guide mechanism for a spinning reel according to a second aspect of the present invention is the fishing line guide mechanism of the first aspect, further including a fixed shaft cover portion arranged spaced apart from the first bail support member. The fixed shaft cover portion has a second mounting recess formed at a tip end surface potion of said fixed shaft cover portion so as to open toward the bulging portion. The mounting member further has a second end portion, the second end portion being configured to be fixedly coupled to the second mounting recess of the fixed shaft cover portion.

With this fishing line guide mechanism, the elongated portion of the bail is integrally formed with the bulging portion, and the separate mounting member is mounted in the bulging portion. Here, the manufacture of the mounting member is simplified when compared to the manufacturing methods of conventional structures in which the elongated portion and the bulging portion are integrally formed, because the mounting member is formed separately from the elongated portion and the bulging portion. Thus, the rate at which bails can be produced can be increased, and increases in manufacturing costs can be controlled.

A fishing line guide mechanism according to a third aspect of the present invention is the fishing line guide mechanism of the second aspect in which the end surface portion of the bulging portion and the tip end surface portion of the fixed shaft cover portion are circular in shape, and the outer diameter of the end surface portion of the bulging portion is larger than the outer diameter of the tip end surface portion of the fixed shaft cover portion. With this configuration, the outer diameter of the end surface portion of the bulging portion of the bail is formed to be larger than the outer diameter of the tip end surface portion of the fixed shaft cover potion. Thus, an uneven surface will be produced which declines in diameter in a direction from the bail toward the fixed shaft cover portion. Thus, it will be difficult for fishing line to become snagged on the uneven surface when the fishing line shifts from the bail toward the fixed shaft cover portion during winding. Thus, the fishing line will be smoothly guided from the bail to the fixed shaft cover portion, making it difficult for line tangling to occur.

A fishing line guide mechanism according to a fourth aspect of the present invention is the fishing line guide mechanism of the second or third aspect, in which the end surface portion of the bulging portion and the tip end surface portion of the fixed shaft cover portion are planar, and the end surface portion of the bulging portion is larger than the tip end surface portion of the fixed shaft cover portion.

The fishing line guide mechanism according to a fifth aspect of the present invention is the fishing line guide mechanism of the second or third aspect, in which the end surface portion of the bulging portion and he tip end surface portion of said the shaft cover portion are smoothly curved surfaces that are designed to contact each other. With this configuration, it will be difficult for a gap to be produced between the bulging portion and the fixed shaft cover portion because these contact surfaces therebetween are formed into smoothly curved surfaces. Even if the bulging portion and the fixed shaft cover portion are not formed with a high degree of precision it will be difficult for a gap to be produced as mentioned.

A fishing line guide mechanism according to a sixth aspect of the present invention is the fishing line guide mechanism of any of the first through fifth aspects, in which the elongated portion is a cylindrically shaped solid member. With this configuration, a high degree of strength for the bail can be ensured by forming the interior of the elongated portion solid.

A fishing line guide mechanism according to a seventh aspect of the present invention is the fishing line guide mechanism of any of the first through sixth aspects, in which the elongated portion and the bulging portion are integrally formed by a swaging process. With this configuration, it will be easier for the elongated portion and the bulging portion to be formed by performing a swaging process (drawing by using a mold).

A fishing line guide mechanism according to an eighth aspect of the present invention is the fishing line guide mechanism of any of the first to seventh aspects, in which the elongated portion and the bulging portion are made of a stainless steel alloy. With this configuration, a high level of rigidity for the elongated portion and the bulging portion can be ensured.

A fishing line guide mechanism according to a ninth aspect of the present invention is the fishing line guide mechanism of any of the first to eighth aspects, in which the mounting member is made of an aluminum alloy. With this configuration, the workability of the mounting member is improved.

A fishing line guide mechanism according to a tenth aspect of the present invention is the fishing line guide mechanism of any of the first to ninth aspects, in which the mounting member is press fitted into the first mounting recess. With this configuration, the mounting member can be easily and reliably fixed in the first mounting recess.

A fishing line guide mechanism for a spinning reel according to an eleventh aspect of the present invention is the fishing line guide mechanism of any of the second through tenth aspects, and further includes a fixed shaft having a tip end portion fixedly coupled to he first bail support member, and a base end portion fixedly arranged to the fixed shaft cover portion.

A fishing line guide mechanism for a spinning reel according to a twelfth aspect of the present invention is the fishing line guide mechanism of the eleventh aspect, in which the fixed shaft at its base end portion is integrally formed with the fixed shaft cover portion as a one-piece unitary member.

A fishing line guide mechanism for a spinning reel according to a thirteenth aspect of the present invention is the fishing line guide mechanism of any of the first and sixth through tenth aspects, the first mounting recess of the fixed shaft cover portion is formed at a base end surface portion of the fixed shaft cover portion so as to open toward the first bail support portion, and the mounting member has a second end portion, the second end portion being fixedly coupled to the first bail support member via a fixing nut, the line roller being rotatively supported by the mounting member.

With this fishing line guide mechanism, the bail and the fixed shaft cover portion are integrally formed with each other, and the fixed shaft as the mounting member is mounted in the first mounting recess of the fixed shaft cover. Here, the manufacture of the mounting member can be simplified, and increases in manufacturing costs can be controlled because the mounting portion of the fixed shaft is formed separately from the bail and the fixed shaft cover.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Configuration and Configuration of the Reel Unit

Figure 1:
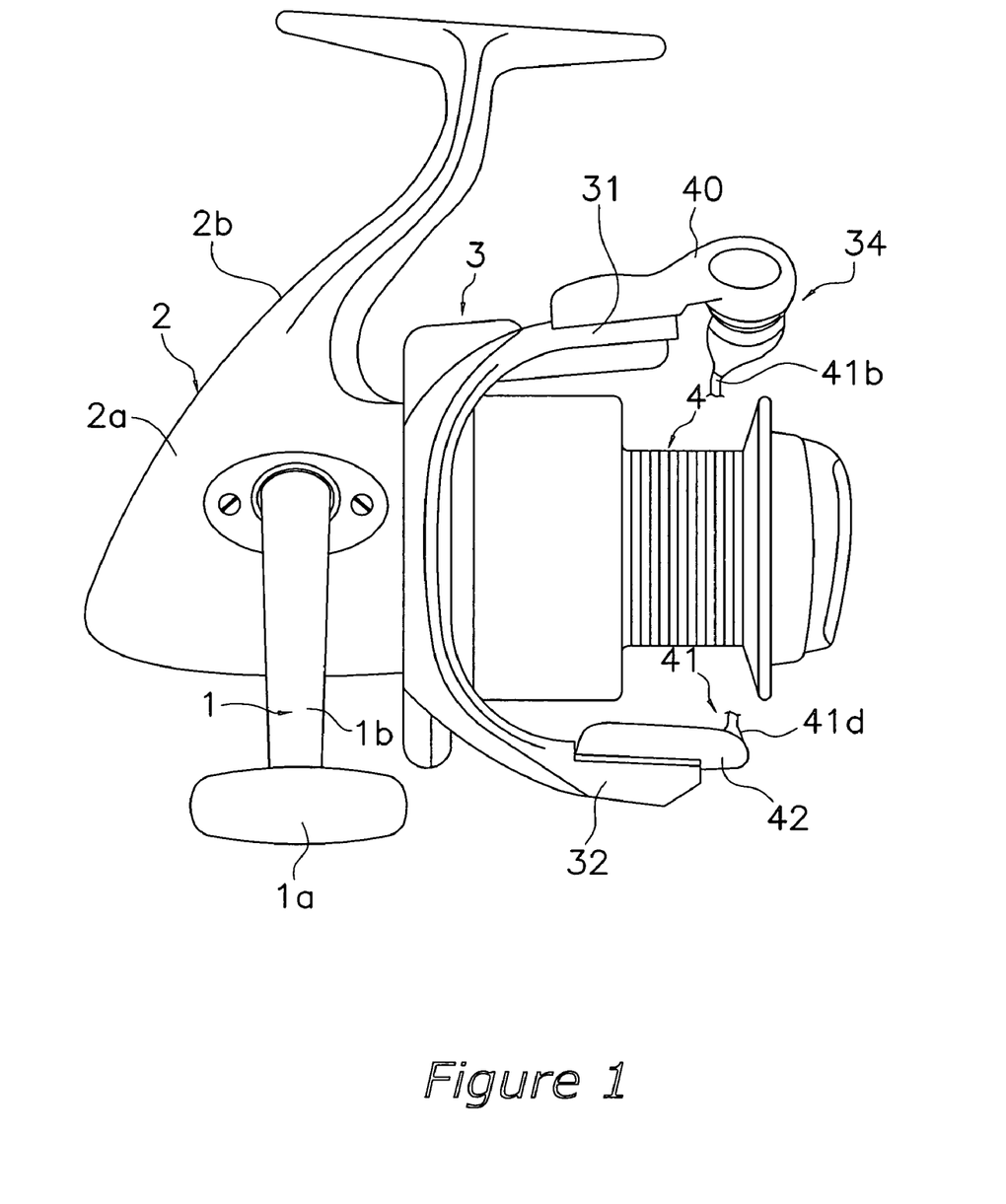
FIG. 1 is a right side elevational view of a spinning reel in accordance with a preferred embodiment of the present invention.
Figure 2:
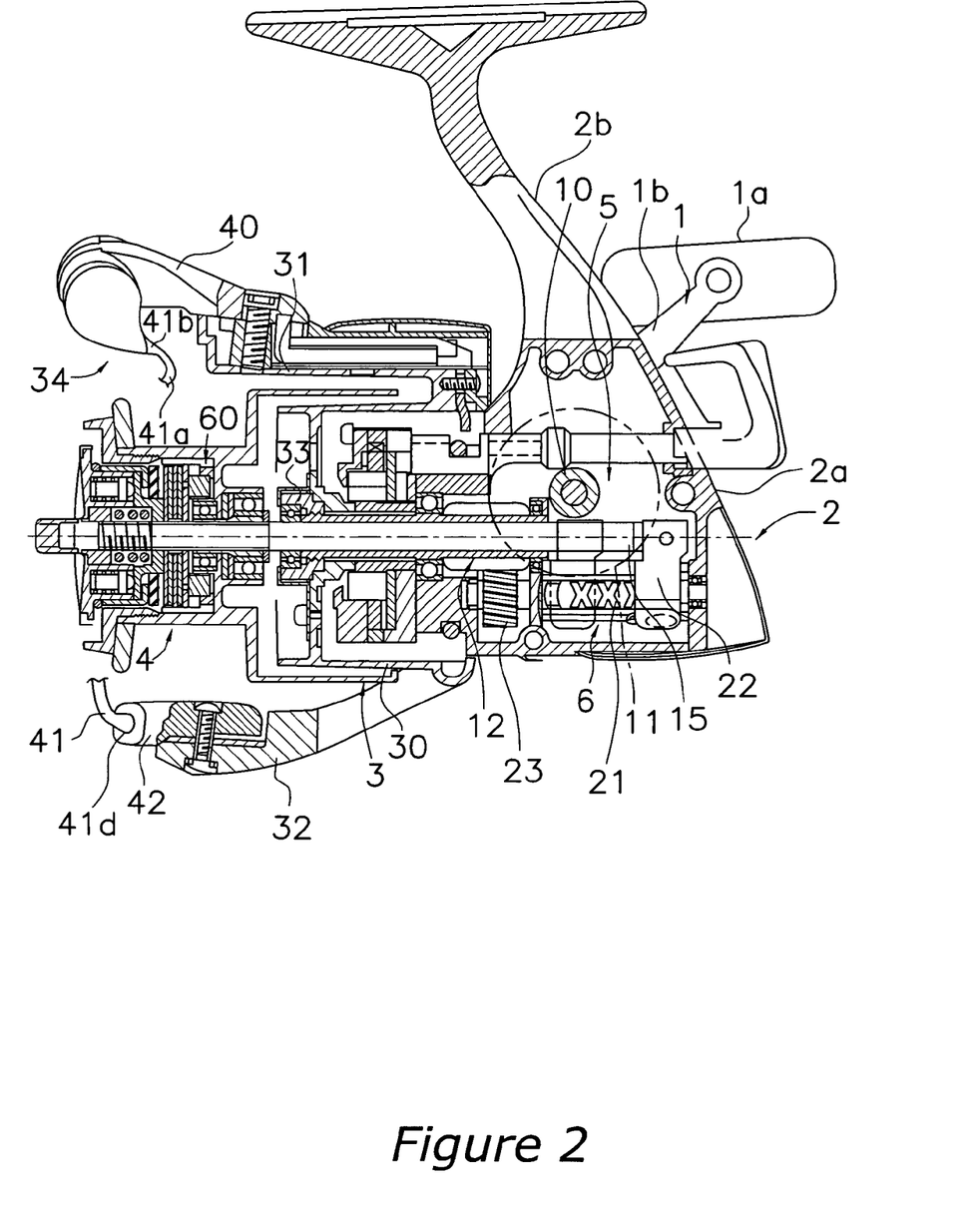
FIG. 2 is a left side cross-sectional view of the spinning reel in accordance with the preferred embodiment of the present invention.

As shown in FIGS. 1 and 2, a spinning reel in accordance with an embodiment of the present invention primarily includes a handle 1, a reel unit 2 that rotatively supports the handle 1, a rotor 3, and a spool 4. The rotor 3 is rotatively supported at the front of the reel unit 2. The spool 4 is configured to have fishing line wound around the outer peripheral surface thereof. Further, the spool 4 is disposed on the front of the rotor 3 so that it can be shifted back and forth relative to the reel unit 2. The handle 1 includes a T-shaped grip portion 1a and an L-shaped crank arm 1b that has an end portion that is rotatively attached to the grip portion 1a.

As shown in FIGS. 1 and 2, the reel unit 2 includes a reel body 2a having an opening on its side and a T-shaped rod attachment leg 2b extending diagonally upward to the front and formed integrally with the reel body 2a. As shown in FIG. 2, the reel body 2a has a mechanism accommodating space in the interior thereof, which accommodates a rotor drive mechanism 5 and an oscillating mechanism 6. The rotor drive mechanism 5 transmits the rotation of the handle 1 to rotate the rotor 3. The oscillating mechanism 6 serves to wind up uniformly the fishing line by shifting the spool 4 back and forth. As shown in FIGS. 1 and 2, the spool 4 is disposed between a later-described first rotor arm 31 and a later-described second rotor arm 32 of the rotor 3. Further, the center portion of the spool 4 is coupled to the front end of the spool shaft 15 via a drag mechanism 60 (see FIG. 2).

As shown in FIG. 2, the rotor drive mechanism 5 includes a handle shaft 10 on which the handle 1 is non-rotatably mounted, a master gear 11, and a pinion gear 12. The master gear 11 rotates together with the handle shaft 10. Further, the pinion gear 12 meshes with the master gear 11. Both ends of the handle shaft 10 are rotatively supported on the reel unit 2 via bearings. Both ends of the handle shaft 10 are respectively provided with female-threaded portions of different threaded direction and diameter. Further, the handle 1 can be mounted non-rotatively to these female-threaded portions.

The pinion gear 12 is formed into a hollow tubular shape. Furthermore, the front portion of the pinion gear 12 extends through the center portion of the rotor 3 and is fixedly coupled to the rotor 3 by a nut 33. The middle and the rear end of the pinion gear 12 in the axial direction are respectively and rotatively supported on the reel unit 2 via bearings. Since rotor drive mechanisms are well know to the ordinarily skilled in the art, detailed description of structure and functions of the rotor drive mechanism 5 will be omitted herein.

The oscillating mechanism 6 shifts the spool 4 back and forth. As shown in FIG. 2, the oscillating mechanism 6 includes a worm 21, a slider 22, and an intermediate gear 23. The worm 21 is arranged substantially below the spool shaft 15 and parallel or substantially parallel thereto. The slider 22 moves back and forth along the worm 21, and the intermediate gear 23 is fixedly coupled to the front end of the worm 21. The rear end of the spool shaft 15 is non-rotatably and fixedly coupled the slider 22. The intermediate gear 23 meshes with the pinion gear 12. Since oscillating mechanisms are well know to the ordinarily skilled in the art, detailed description of structure and functions of the oscillating mechanism 6 will be omitted herein.

Configuration of the Rotor

As shown in FIG. 2, the rotor 3 includes a cylindrical portion 30, first and second rotor arms 31 and 32, and a bail arm 34. The cylindrical portion 30 is fixedly coupled to the pinion gear 12. The first rotor arm 31 and the second rotor arm 32 are disposed opposite one another at the sides of the cylindrical portion 30. The bail arm 34 serves as a fishing line guide mechanism to guide the fishing line to the spool 4. The cylindrical portion 30 and the first and second rotor arms 31 and 32 are, for example, made of an aluminum alloy, and are integrally formed with one another as a one piece unitary unit. As noted above, the front and center portions of the cylindrical portion 30 are non-rotatively and fixedly coupled to the front portion of the pinion gear 12 with the nut 33.

Bail Arm Configuration

Figure 3:
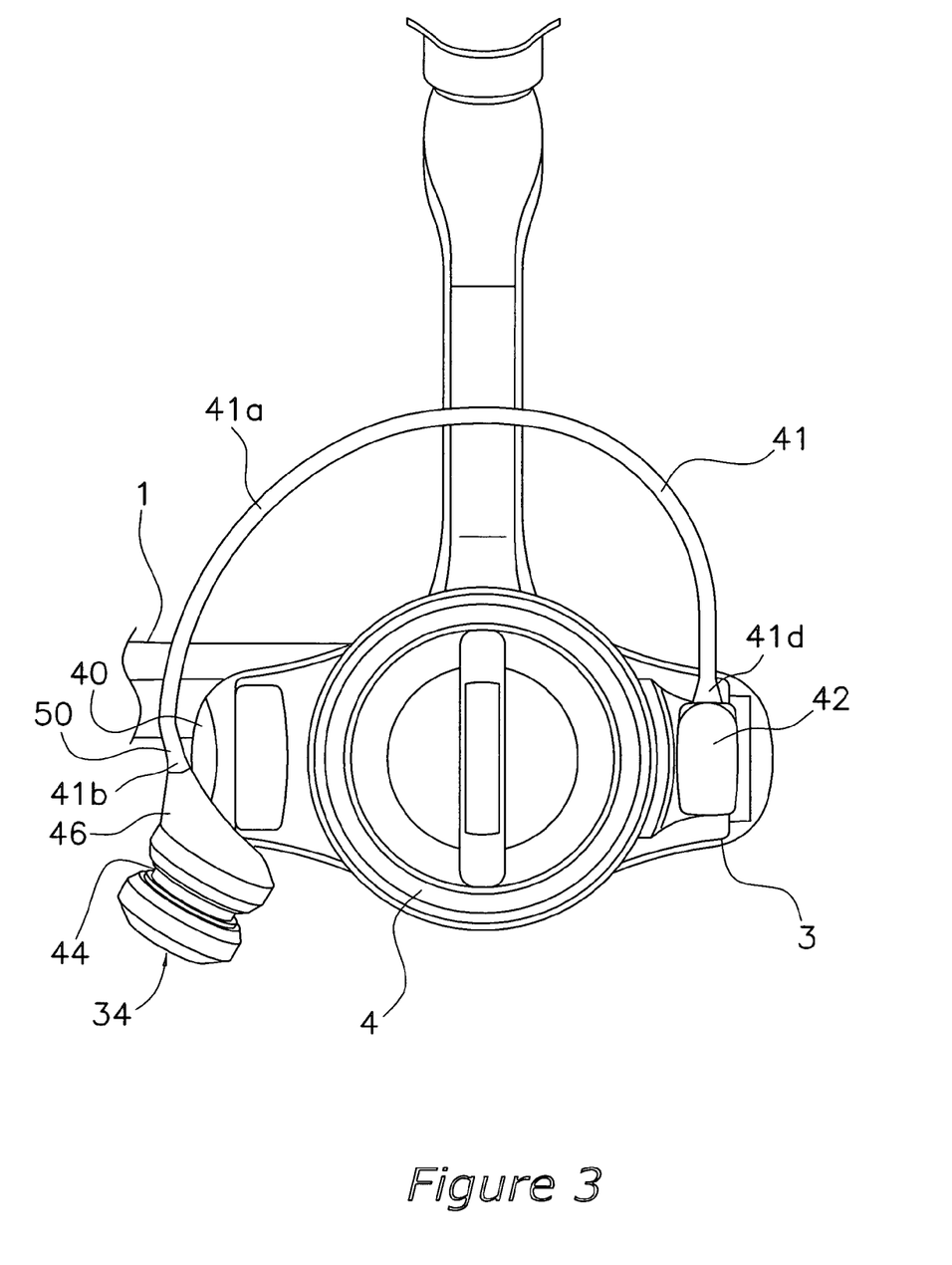
FIG. 3 is a front elevational view of the spinning reel in accordance with the preferred embodiment of the present invention.
Figure 5:
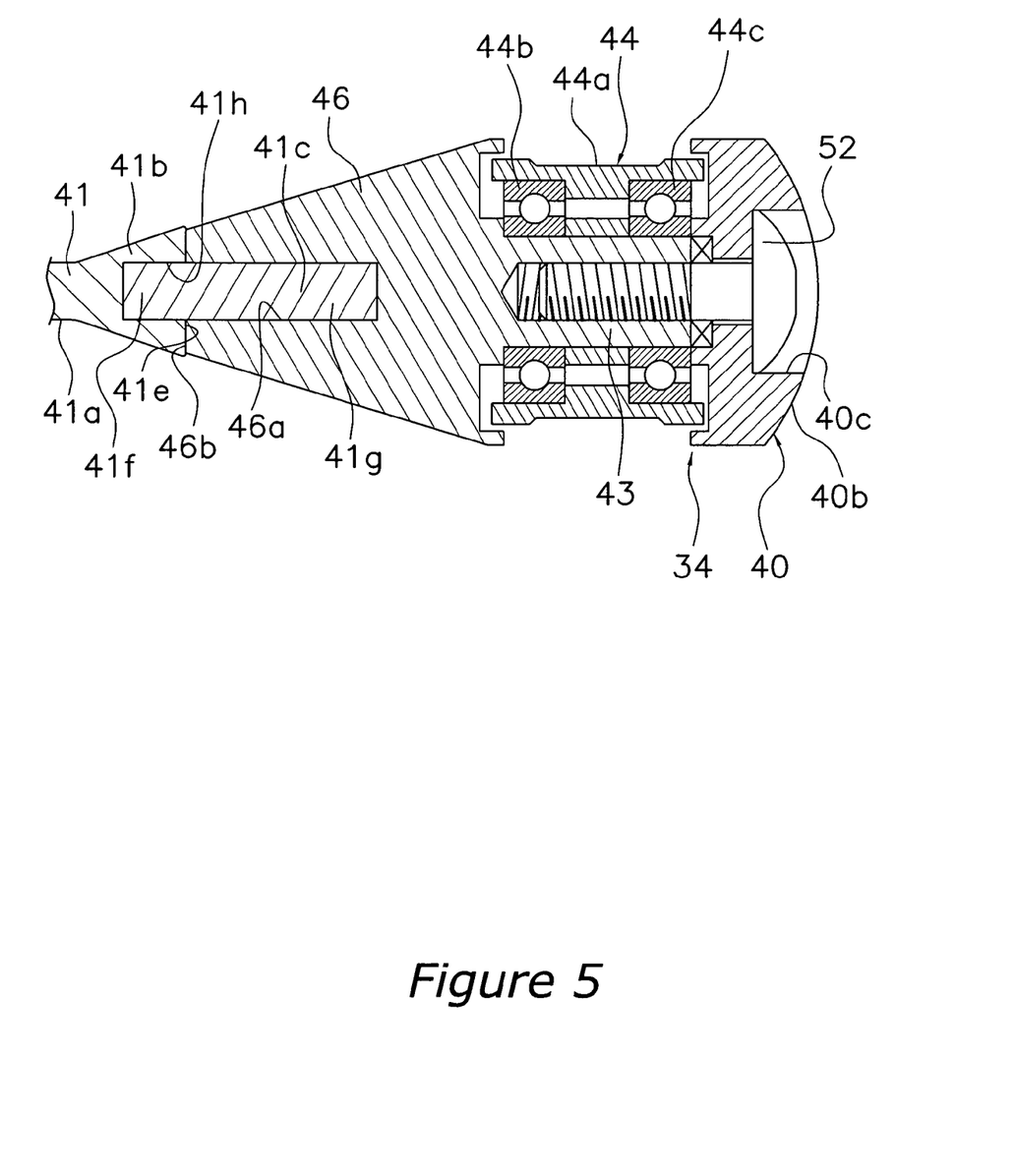
FIG. 5 is a cross-sectional view of the bail arm in accordance with the preferred embodiment of the present invention.

The bail arm 34 is disposed on the front ends of the first rotor arm 31 and the second rotor arm 32, and is pivotable between the line-guiding posture and the line-release posture. The bail arm 34 includes a first bail support member 40 and a second bail support member 42 pivotably mounted on the tips of the first rotor arm 31 and the second rotor arm 32. The first bail support member 40 is pivotably mounted on the outer side of the first rotor arm 31, while the second bail support member 42 is pivotably mounted on the inner side of the second rotor arm 32. As shown in FIGS. 3 and 5, the bail arm 34 further includes a bail 41, a fixed shaft 43, a line roller 44, a fixed shaft cover 46, and a mounting member 41c. The bail 41 connects the first bail support member 40 and the second member 42. The fixed shaft 43 (see FIG. 5) has a tip end that is fixedly coupled to the first bail support member 40. The line roller 44 is supported by the fixed shaft 43 between the fixed shaft cover 46 and the first bail support member 40. Further, the fixed shaft cover 46 covers the fixed shaft 43. In other words, the fixed shaft cover 46 is arranged on a base end of the fixed shaft 43 so as to be spaced apart from the first bail support member 40.

Figure 4:
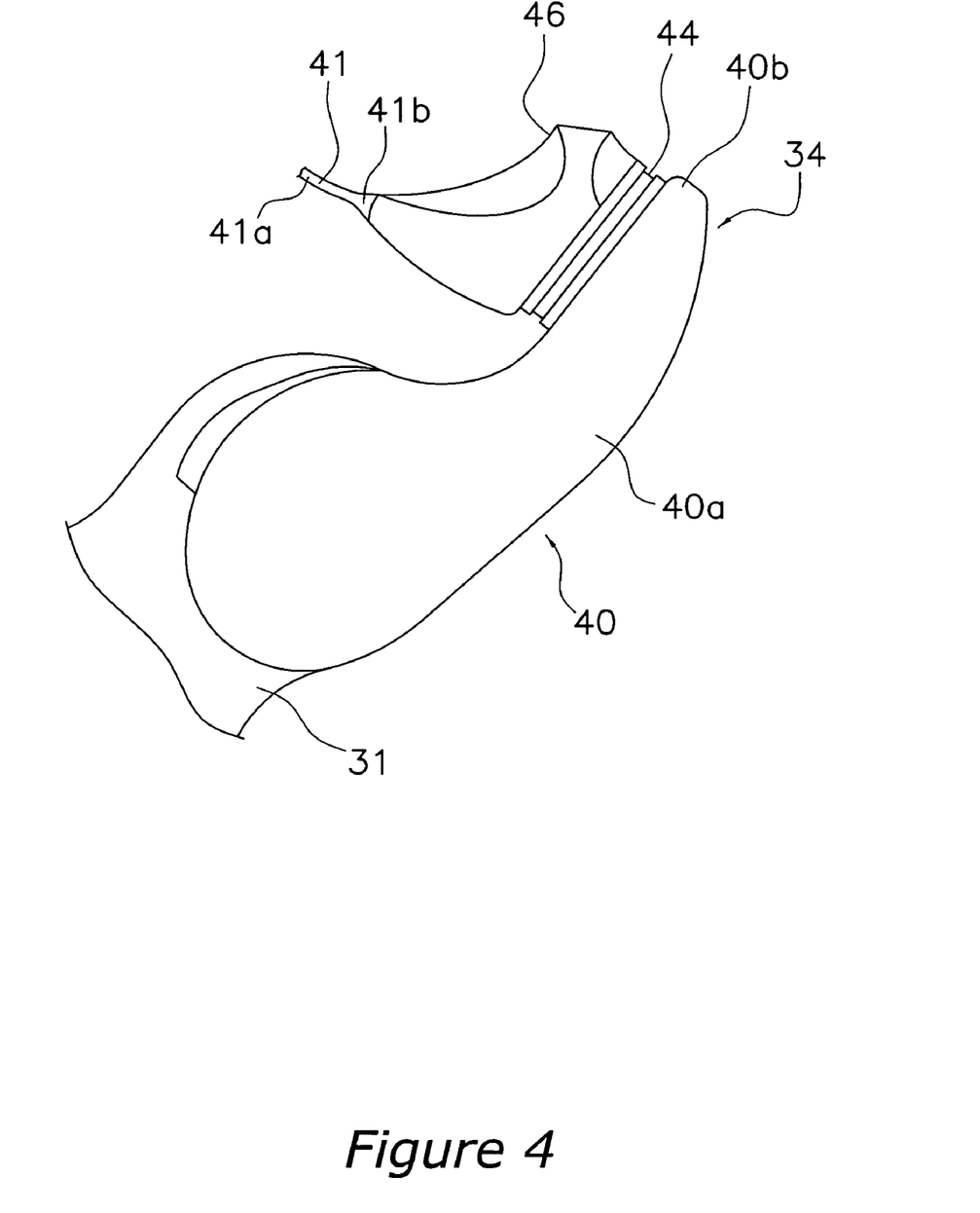
FIG. 4 is an oblique view of a bail arm of the spinning reel in accordance with the preferred embodiment of the present invention.

As shown in FIGS. 4 and 5, the first bail support member 40 includes an arm portion 40a that is pivotably mounted on the first rotor arm 31, and a ring-shaped attachment portion 40b that is integrally formed on the front end of the arm portion 40a, the front end being the end opposite the first rotor arm 31. The attachment portion 40b is provided with a stepped through hole 40c (see FIG. 5), and a fixing bolt 52 to fixedly couple the fixed shaft 43 to the first bail support member 40 passes through the through hole 40c.

As shown in FIG. 3, the bail 41 is a wire-shaped member and preferably made of a stainless steel alloy. The respective ends of the bail 41 are fastened to the second bail support member 42 and the fixed shaft cover 46. The bail 41 curves outward in the circumferential direction of the spool 4. The bail 41 guides fishing line via the fixed shaft cover 46 to the line roller 44 when the bail arm 34 returns from the line-release posture to the line-guiding posture.

As shown in FIG. 5, the fixed shaft 43 is formed by a cutting process to be integrally formed with the fixed shaft cover 46 as a one-piece unitary member. The fixed shaft 43 extends from a base end that is integral with the fixed shaft cover 46 toward the first bail support member 40, and its tip end is fixedly coupled to the first bail support member 40 by a fixing bolt 52.

As shown in FIG. 5, the line roller 44 includes a cylindrical guiding portion 44a and two ball bearings 44b and 44c. The cylindrical guiding portion 44c has an outer peripheral surface provided with a groove to guide the fishing line. The two ball bearings 44b and 44c are arranged to be axially apart on the inner peripheral side of the guide portion 44a. The guide portion 44a is rotatably supported on the fixed shaft 43 via the two bearings 44b and 44c.

Figure 6:
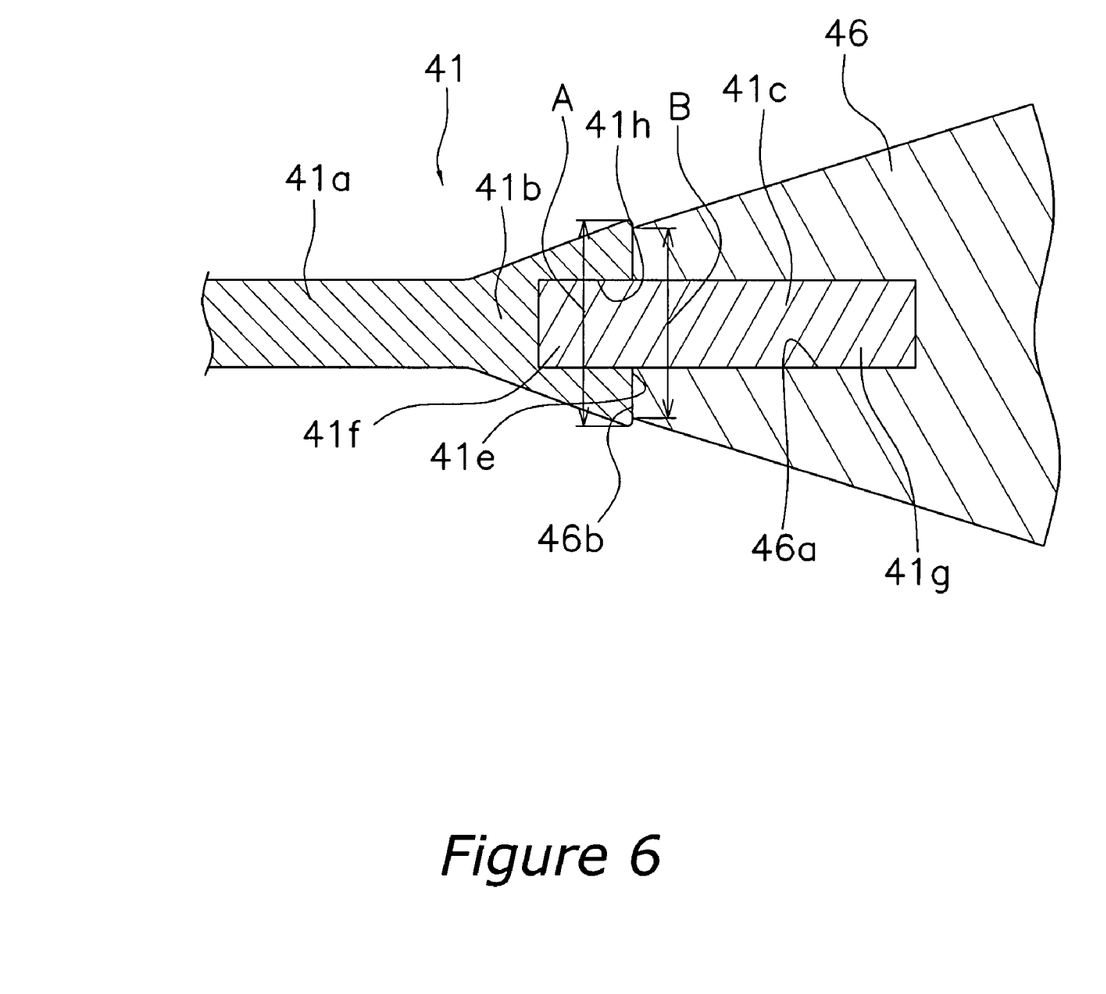
FIG. 6 is an enlarged cross-sectional view of the connecting portions of the bail arm in accordance with the preferred embodiment of the present invention.

As shown in FIG. 5, the fixed shaft cover 46 is arranged on the base end of the fixed shaft 43 to be axially apart from the attachment portion 40b of the first bail support member 40. As shown in an enlarged view in FIG. 6, the front shaft cover 46 is a member that is made of an aluminum alloy and has an approximately truncated cone shape. The front cover 46 has a tip end surface portion 46b that is formed into a circular shape and a mounting recess (an example of second mounting recess) 46a that is formed in the tip end surface portion 46b so as to open toward the first bulging portion 41b. As shown in FIGS. 5 and 6, the tip end surface portion 46b is preferably angled perpendicularly or substantially perpendicularly to an axis of rotation of the bearings 44b and 44c. The bail 41 is preferably made of a stainless steel alloy, and is inserted into the mounting recess 46a of the fixed shaft cover 46.

The bail 41 includes an elongated portion 41a that is curved, and a first bulging portion 41b. A separate, i.e. formed separately, mounting member 41c fixedly arranges the bail 41 to the first bail support member 40. The first bulging portion 41b is integrally formed with the elongated portion 41a such that the diameter (an example of width) of the first bulging portion 41b gradually increases as the first bulging portion 41b extends in a direction away from the elongated portion 41a. The separate mounting member 41c is arranged on the end of the first bulging portion 41b such that the diameter of the mounting member 41c is smaller than that of the first bulging portion 41b. The elongated portion 41a is a solid member that is preferably made of a stainless steel alloy. As shown in FIGS. 1 and 3, the bail 41 is arranged on a connecting portion of the second bail support member 42, and further includes a second bulging portion 41d that is formed to have a diameter that is larger than that of the elongated portion 41a.

As shown in FIG. 6, the first bulging portion 41b smoothly extends from the elongated portion 41a and is integrally formed therewith. The first bulging portion 41b is an approximately truncated cone portion preferably made of a stainless steel alloy and has a diameter (an example of width) that gradually increases as it extends in a direction away from the elongated portion 41a toward the fixed shaft cover 46. The first bulging portion 41b is integrally and uniformly formed with the elongated portion 41a by a swaging process. A mounting recess (an example of first mounting recess) 41h is formed in the uniformly solid first bulging portion 41b, and opens toward the fixed shaft cover 46 side, i.e. opposite from the elongated portion side of the bulging portion 41b. Further, the mounting recess 41h has the mounting member 41c mounted therein, such that the bail 41 is fixedly arranged to the first bail support member 40.

An end surface portion 41e of the first bulging portion 41b is circular in shape and contacts the tip end surface portion 46b of the fixed shaft cover 46. The contact surfaces of the end surface portion 41e of the first bulging portion 41b and the tip end surface portion 46b of the fixed shaft cover 46 are planar. Also, as seen in FIG. 6, the end surface portion 41e of the first bulging portion 41b is greater than the tip end surface portion 46b of the fixed shaft cover 46. Particularly, an outer diameter A of the end surface portion 41e of the first bulging portion 41b is formed to be larger than an outer diameter B of the tip end surface portion 46b of the fixed shaft cover 46.

A second end portion 41f of the mounting member 41c is mounted in the mounting recess 41h of the first bulging portion 41b, and a first end portion 41g of the mounting member 41c is mounted in the mounting recess 46a of the fixed shaft cover 46. Both first and second end portions 41f and 41g are cylindrical in shape. The mounting member 41c is preferably made of an aluminum alloy. Further, the second end portion 41f and the first end portion 41g are respectively pressed into and fixedly coupled to the mounting recess 41h and the mounting recess 46a.

With this spinning reel, the elongated portion 41a and the first bulging portion 41b of the bail 41 are integrally formed as a one-piece unitary member, and a separate mounting member 41c is mounted in the first bulging portion 41b. Here, manufacturing of the mounting member 41c can be simplified because the mounting member 41c is formed separately from the elongated portion 41a and the first bulging portion 41b. Thus, the rate at which bails 41 can be produced can be increased, and an increase in manufacturing costs can be controlled.

ALTERNATE EMBODIMENTS

Alternate embodiments will now be explained. In view of the similarity between the first and second embodiments, the parts of the alternate embodiments that are identical to the parts of the first embodiment will be given the same reference numerals as those of the parts of the first embodiment. Moreover, the descriptions of the parts of the alternate embodiments that are identical to the parts of the first embodiment may be omitted for the sake of brevity.

(a) In the aforementioned embodiment, a front drag type spinning reel was used as an example, but the present invention can also be applied to any type of spinning reel, such as rear drag type spinning reels, spinning reels that do not have a drag, lever drag spinning reels, and the like.

(b) In the aforementioned embodiment, the elongated portion 41a and the first bulging portion 41b are integrally formed by a swaging process. However the present invention is not limited to this method of manufacturing the elongated portion 41a and the first bulging portion 41b, and these portions may be integrally formed by other manufacturing methods such as a forging method or the like. In addition, the elongated portion 41a and the first bulging portion 41b are made of a stainless steel alloy, and the mounting member 41c is made of an aluminum alloy, but the present invention is not limited to these materials.

Figure 7:
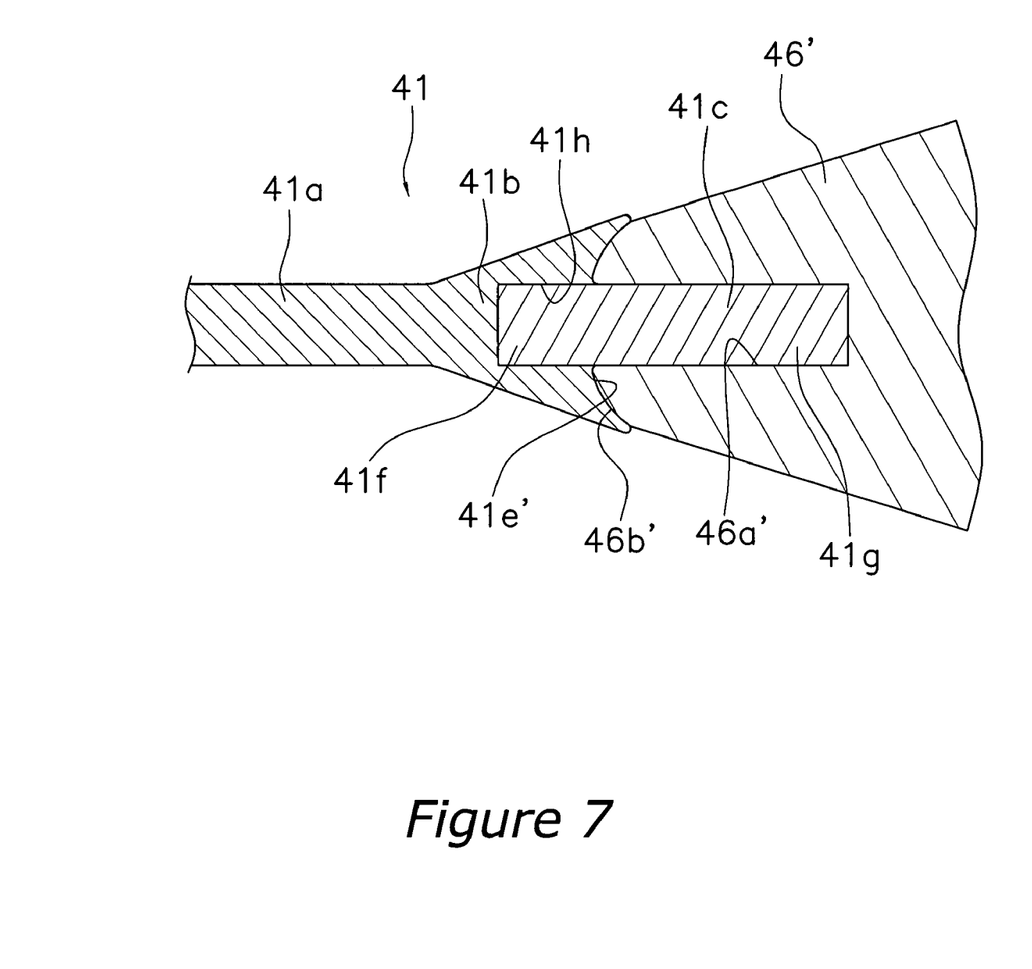
FIG. 7 is an enlarged cross-sectional view of the connecting portions of a bail in accordance with another preferred embodiment of the present invention.

(c) In the aforementioned embodiment, the contact surfaces of the end surface portion 41e of the first bulging portion 41b and the tip end surface portion 46b of the fixed shaft cover 46 are planar. However, as shown in FIG. 7, the contact surfaces of an end surface portion 41e' of the first bulging portion 41b and a tip end surface portion 46b' of the fixed shaft cover 46' may be smoothly curved surfaces whose contours are aligned to one another such that the end surface portion 41e' and the tip end surface portion 46b' snugly contact each other.

Figure 8:
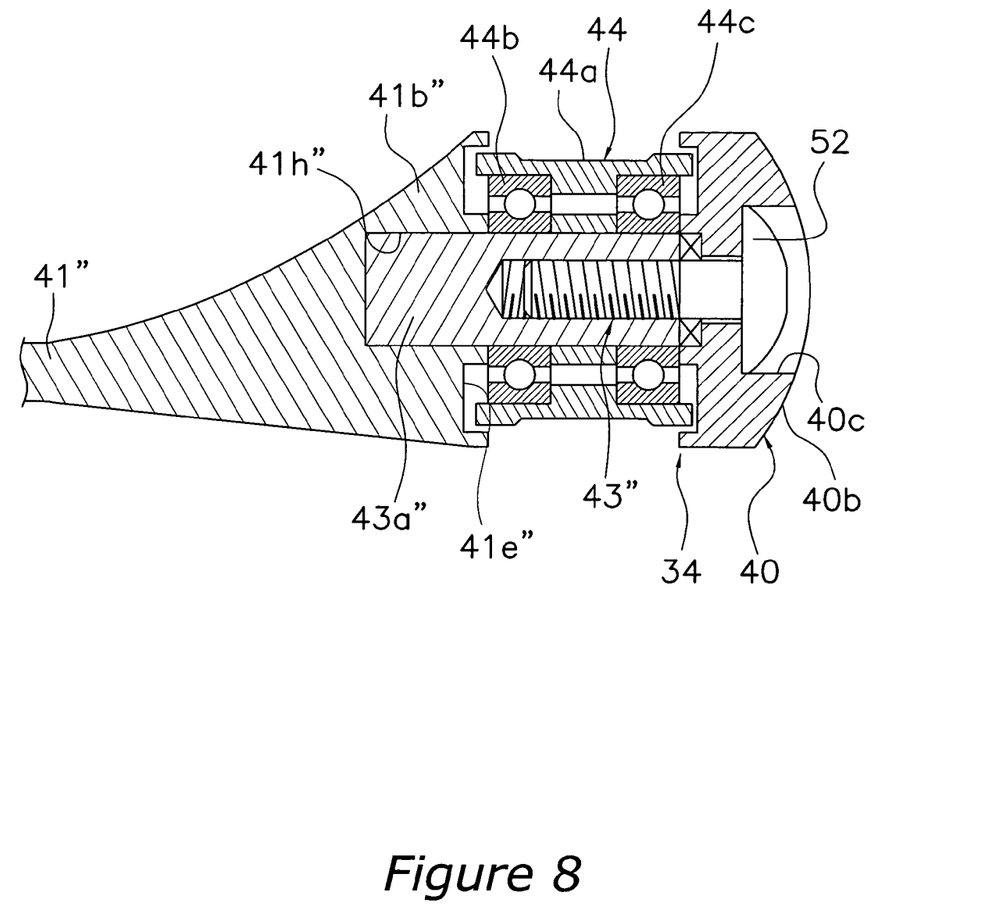
FIG. 8 is a cross-sectional view of the bail arm in accordance with still another preferred embodiment of the present invention.

(d) In the aforementioned embodiment, the fixed shaft 43 is integrally formed with the fixed shaft cover 46, but it is also possible to form the fixed shaft 43 and the fixed shaft cover 46 separately. For example, In the embodiment shown in FIG. 8, the fixed shaft cover is integrally formed with the bulging portion 41b" of the bail 41" as a one-piece unitary member, and the end portion (first end portion in this embodiment) 43a" of a separate fixed shaft (mounting member in this embodiment) 43" formed into a cylindrical shape is press fitted into a mounting recess (first mounting recess in this embodiment) 41h" of the bulging portion 41b". The mounting recess 41h" is formed in an end surface portion 41e" of the fixed bulging portion 41b" so as to open toward the first bail support member 40. The fixed shaft 43" in this manner fixedly arranges the bail 41" to the first bail support member 40. With this structure, the manufacturing of the fixed shaft 43" can be simplified and manufacturing costs can be controlled.

According to the present invention, the elongated portion and the bulging portions of the bail of the fishing line guide mechanism are integrally formed, and thus the manufacturing of the mounting portion can be simplified and manufacturing costs can be controlled.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-118498. The entire disclosure of Japanese Patent Application No. 2003-118498 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing line guide mechanism adapted to be mounted to front ends of a first rotor arm and a second rotor arm of a rotor of a spinning reel, said line guide mechanism being adapted to be pivotable between a line-guiding posture and a line-releasing posture and comprising:
   a first bail support member and a second bail support member respectively pivotably mounted to front ends of the first rotor arm and the second rotor arm;
   a line roller rotatively supported by said first bail support member to guide fishing line on its outer peripheral surface;
   a bail disposed between said first bail support member and said second bail support member to lead fishing line to said line roller, said bail including
      an elongated portion being configured to guide fishing line to said line roller, and
      a bulging portion being integrally formed with one end of said elongated portion, a width of said bulging portion increasing in a direction away from said elongated portion, said bulging portion having a first mounting recess at its end surface portion;
   a mounting member having a first end portion, said first end portion being configured to be fixedly coupled to said first mounting recess of said bulging portion such that said bail is fixedly arranged to said first bail support member; and
   a fixed shaft cover portion arranged spaced apart from said first bail support member, said fixed shaft cover portion having a second mounting recess formed at a tip end surface potion of said fixed shaft cover portion so as to open toward said bulging portion,
   said mounting member further having a second end portion, said second end portion being configured to be fixedly coupled to said second mounting recess of said fixed shaft cover portion.

2. The fishing line guide mechanism as set forth in claim 1, wherein
   said end surface portion of said bulging portion and said tip end surface portion of said fixed shaft cover portion are circular in shape, and
   an outer diameter of said end surface portion of said bulging portion is larger than an outer diameter of said tip end surface portion of said fixed shaft cover portion.

3. The fishing line guide mechanism as set forth in claim 1, wherein
   said end surface portion of said bulging portion and said tip end surface portion of said fixed shaft cover portion are planar, and
   said end surface portion of said bulging portion is larger than said tip end surface portion of said fixed shaft cover portion.

4. The fishing line guide mechanism as set forth in claim 1, wherein
   said end surface portion of said bulging portion and said tip end surface portion of said fixed shaft cover portion are smoothly curved surfaces that are designed to contact each other.

5. The fishing line guide mechanism as set forth in claim 1, wherein
   said elongated portion is a cylindrically shaped solid member.

6. The fishing line guide mechanism as set forth in claim 1, wherein said elongated portion and said bulging portion are integrally formed by a swaging process.

7. The fishing line guide mechanism as set forth in claim 1, wherein
said elongated portion and said bulging portion are made of a stainless steel alloy.

8. The fishing line guide mechanism as set forth in claim 1, wherein
said mounting member is made of an aluminum alloy.

9. The fishing line guide mechanism as set forth in claim 1, wherein
said mounting member is press fitted into said first mounting recess.

10. The fishing line guide mechanism as set forth in claim 1, further comprising
a fixed shaft having a tip end portion fixedly coupled to said first bail support member, and a base end portion fixedly arranged to said fixed shaft cover portion.

11. The fishing line guide mechanism as set forth in claim 10, wherein
said fixed shaft at its base end portion is integrally formed with said fixed shaft cover portion as a one-piece unitary member.

12. A spinning reel comprising:
a reel unit;
a handle being rotatively supported by said reel unit;
a rotor being rotatively supported on a front of said reel unit, said rotor having a cylindrical portion, first and second rotor arms opposite one another at sides of said cylindrical portion, and a fishing line guide mechanism mounted to front ends of said first and second rotor arms so as to be pivotable between a line-guiding posture and a line-releasing posture, said fishing line guide mechanism including
a first bail support member and a second bail support member respectively pivotably mounted to the front ends of said first and second rotor arms;
a line roller rotatively supported by said first bail support member to guide fishing line on its outer peripheral surface;
a bail disposed between said first bail support member and said second bail support member to lead fishing line to said line roller, said bail including
an elongated portion being configured to guide fishing line to said line roller, and
a bulging portion being integrally formed with one end of said elongated portion, a width of said bulging portion increasing in a direction away from said elongated portion, said bulging portion having a first mounting recess at its end surface portion;
a mounting member having a first end portion, said first end portion being configured to be fixedly coupled to said first mounting recess of said bulging portion such that said bail is fixedly arranged to said first bail support member; and
a fixed shaft cover portion arranged spaced apart from said first bail support member, said fixed shaft cover portion having a second mounting recess formed at a tip end surface potion of said fixed shaft cover portion so as to open toward said bulging portion; and
a spool being supported on a front of said rotor, said spool being configured to shift forward and backward relative to said reel unit, an outer periphery of said spool being configured to have fishing line wound thereon,
said mounting member further having a second end portion, said second end portion being configured to be fixedly coupled to said second mounting recess of said fixed shaft cover portion.

13. The spinning reel as set forth in claim 12, wherein
said end surface portion of said bulging portion and said tip end surface portion of said fixed shaft cover portion are circular in shape, and
an outer diameter of said end surface portion of said bulging portion is larger than an outer diameter of said tip end surface portion of said fixed shaft cover portion.

14. The spinning reel as set forth in claim 12, wherein
said end surface portion of said bulging portion and said tip end surface portion of said fixed shaft cover portion are planar, and
said end surface portion of said bulging portion is larger than said tip end surface portion of said fixed shaft cover portion.

15. The spinning reel as set forth in claim 12, wherein
said end surface portion of said bulging portion and said tip end surface portion of said fixed shaft cover portion are smoothly curved surfaces that are designed to contact each other.

16. The spinning reel as set forth in claim 12, wherein
said elongated portion is a cylindrically shaped solid member.

17. The spinning reel as set forth in claim 12, wherein
said elongated portion and said bulging portion are integrally formed by a swaging process.

18. The spinning reel as set forth in claim 12, wherein
said elongated portion and said bulging portion are made of a stainless steel alloy.

19. The spinning reel as set forth in claim 12, wherein
said mounting member is made of an aluminum alloy.

20. The spinning reel as set forth in claim 12, wherein
said mounting member is press fitted into said first mounting recess.

21. The spinning reel as set forth in claim 12, further comprising
a fixed shaft having a tip end portion fixedly coupled to said first bail support member, and a base end portion fixedly arranged to said fixed shaft cover portion.

22. The spinning reel as set forth in claim 21, wherein
said fixed shaft at its base end portion is integrally formed with said fixed shaft cover portion as a one-piece unitary member.

23. A fishing line guide mechanism adapted to be mounted to front ends of a first rotor arm and a second rotor arm of a rotor of a spinning reel, said line guide mechanism being adapted to be pivotable between a line-guiding posture and a line-releasing posture and comprising:
a first bail support member and a second bail support member respectively pivotably mounted to front ends of the first rotor arm and the second rotor arm;
a line roller rotatively supported by said first bail support member to guide fishing line on its outer peripheral surface;
a bail disposed between said first bail support member and said second bail support member to lead fishing line to said line roller, said bail including
an elongated portion being configured to guide fishing line to said line roller, and
a bulging portion being solid and unitarily formed with one end of said elongated portion, a width of said bulging portion increasing in a direction away from said elongated portion, said bulging portion having a first mounting recess at its end surface portion, a largest diameter of the first mounting recess being smaller than a diameter of said line roller; and a mounting member having a first end portion, said first end portion being configured to be fixedly coupled to said first mounting recess of said bulging portion such that said bail is fixedly arranged to said first bail support member.

24. The fishing line guide mechanism as set forth in claim 23, wherein said mounting member has a second end portion, said second end portion being fixedly coupled to said first bail support member via a fixing nut, said line roller being rotatively supported by said mounting member.

* * * * *